(12) United States Patent
Kim et al.

(10) Patent No.: US 10,107,082 B2
(45) Date of Patent: Oct. 23, 2018

(54) FRACTURE MONITORING AND CHARACTERISATION

(71) Applicant: SCHLUMBERGER TECHNOLOGY CORPORATION, Sugar Land, TX (US)

(72) Inventors: Ahyi Kim, Yokohama (JP); Jean Desroches, La Défense (FR); Ian Bradford, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 313 days.

(21) Appl. No.: 14/414,339

(22) PCT Filed: Jul. 8, 2013

(86) PCT No.: PCT/IB2013/055571
§ 371 (c)(1),
(2) Date: Jan. 12, 2015

(87) PCT Pub. No.: WO2014/009866
PCT Pub. Date: Jan. 16, 2014

(65) Prior Publication Data
US 2015/0198028 A1    Jul. 16, 2015

(30) Foreign Application Priority Data
Jul. 11, 2012  (GB) .................................. 1212298.2

(51) Int. Cl.
*E21B 43/26*      (2006.01)
*G01V 1/28*       (2006.01)
(Continued)

(52) U.S. Cl.
CPC ............ *E21B 43/26* (2013.01); *E21B 43/267* (2013.01); *E21B 47/00* (2013.01); *G01V 1/282* (2013.01);
(Continued)

(58) Field of Classification Search
CPC ............... E21B 49/006; E21B 41/0092; E21B 2041/0028
See application file for complete search history.

(56) References Cited

U.S. PATENT DOCUMENTS 3,948,325 A * 4/1976 Winston .................. E21B 43/26
                                                           166/307
6,766,254 B1   7/2004 Bradford et al.
(Continued)

FOREIGN PATENT DOCUMENTS

CN          1043185 A    1/1993
CN        101351523 A    1/2009
(Continued)

OTHER PUBLICATIONS

Rutledge et al., "Hydraulic Stimulation of Natural Fractures as Revealed by Induced Microearthquakes, Carthage Cotton Valley Gas Field, East Texas," Geophysics, vol. 68, No. 2 (Mar.-Apr. 2003), pp. 441-452.
(Continued)

*Primary Examiner* — Jennifer H Gay

(57) ABSTRACT

Fracture monitoring and characterization of a subterranean fracturing process is described. Hydraulic fracturing conditions intended to induce tensile crack opening or compressional crack closure of a fracture responsible for a microseismic event in the Earth formation are selected and a hydraulic fracturing operation is performed using the selected conditions to cause tensile crack opening or compressional crack closure of the fracture responsible for a
(Continued)

microseismic event in the Earth formation. Induced motion data from the microseismic event is received using a plurality of receivers, and the received data is analyzed to track the development of the fracture responsible for the microseismic event and/or to track a proppant distribution within the fracture.

11 Claims, 5 Drawing Sheets

(51) Int. Cl.
    *E21B 47/00*     (2012.01)
    *G01V 1/30*     (2006.01)
    *G01V 1/40*     (2006.01)
    *E21B 43/267*     (2006.01)

(52) U.S. Cl.
    CPC ............... *G01V 1/288* (2013.01); *G01V 1/30* (2013.01); *G01V 1/40* (2013.01); *G01V 2210/1234* (2013.01); *G01V 2210/646* (2013.01)

(56) References Cited

U.S. PATENT DOCUMENTS

| | | | |
|---|---|---|---|
| 6,856,575 B2 | 2/2005 | Jones | |
| 6,947,843 B2 | 9/2005 | Fisher et al. | |
| 6,981,550 B2 | 1/2006 | Haheim et al. | |
| 2005/0051327 A1* | 3/2005 | Vinegar | E21B 36/02 166/256 |
| 2005/0190649 A1 | 9/2005 | Eisner et al. | |
| 2006/0113077 A1 | 6/2006 | Willberg et al. | |
| 2006/0123850 A1 | 6/2006 | Demars et al. | |
| 2009/0048783 A1* | 2/2009 | Jechumtalova | G01V 1/008 702/11 |
| 2010/0256964 A1* | 10/2010 | Lee | G01V 11/00 703/10 |
| 2011/0067857 A1* | 3/2011 | Underhill | E21B 43/26 166/250.01 |
| 2011/0209868 A1 | 9/2011 | Dusterhoft et al. | |
| 2015/0185344 A1* | 7/2015 | Bardainne | G01V 1/30 702/14 |
| 2015/0198028 A1* | 7/2015 | Kim | G01V 1/288 166/250.1 |

FOREIGN PATENT DOCUMENTS

| | | |
|---|---|---|
| CN | 101833113 A | 9/2010 |
| CN | 102203638 A | 9/2011 |
| WO | 2004/072424 A1 | 8/2004 |
| WO | 2005/006020 A1 | 1/2005 |
| WO | 2012/046206 A2 | 4/2012 |

OTHER PUBLICATIONS

Rutledge et al, "Faulting Induced by Forced Injection and Fluid Flow Forced by Faulting: An Interpretation of Hydraulic-Fracture Microseismicity, Carthage Cotton Valley Gas Field, Texas," Bulletin of the Seismological Society of America., vol. 94, No. 5, (Oct. 2004) pp. 1817-1830.

Fredd et al., "Experimental Study of Fracture Conductivity for Water-Fracturing and Conventional Fracturing Applications," SPE 74138, (Sep. 2001), pp. 288-298.

Dufumier et al., "On the Resolution of the Isotropic Component in Moment Tensor Inversion," Geophys. J. Int. (1997) 131, 595-606.

Langston, Charles, A., "Source Inversion of Seismic Waveforms: The Koyna, India, Earthquakes of Sep. 13, 1967," Bulletin of the Seismological Society of America, 71 (Feb. 1981), pp. 1-24.

Minson et al., "Stable Inversions for Complete Moment Tensors," Geophys. J. Int. (2008) 174, pp. 585-592.

Minson et al, "Seismically and Geodetically Determined Non-double-couple Source Mechanisms From the 2000 Miyakejima Volcanic Earthquake Swarm," Journal of Geophysical Research, vol. 112 BI0308, doi:10.1029/2006JB004847 (2007) pp. 1-20.

Taira et al, "Seismic Evidence for Dilatational Source Deformations Accompanying the 2004-2008 Yellowstone Accelerated Uplift Episode," Journal of Geophysical Research, 115, B02301, doi: 10.1029/20081800628.

International Search Report and Written Opinion for corresponding PCT Application Serial No. PCT/IB2013/055571 dated Mar. 3, 2014, 14 pages.

Ahyi, et al., "Uncertainities in full waveform moment tensor inversion due to limited microseismic monitoring array geometry", Jan. 1, 2011, SEG Technical Program Expanded Abstracts, pp. 1509-1513.

Second Office Action of corresponding Chinese Application Serial No. 201380036624.2, dated Dec. 29, 2016, 22 pages.

\* cited by examiner

FRACTURE MONITORING AND CHARACTERISATION

This application is a U. S. National Stage Application under 35 U.S.C. § 371 and claims priority to Patent Cooperation Treaty Application Number PCT/IB2013/055571 filed Jul. 8, 2013, which claims the benefit of G.B. Patent Application No. 1212298.2 filed on Jul. 11, 2012; both of these applications are incorporated by reference herein in their entireties.

BACKGROUND

This disclosure relates in general to the monitoring of a fracturing operation, and to the characterisation of fracture networks in an Earth formation.

The characterisation of subsurface strata is important for identifying, accessing and managing reservoirs. The depths and orientations of such strata can be determined, for example, by seismic surveying. This is generally performed by imparting energy to the earth at one or more source locations, for example, by way of controlled explosion, mechanical input etc. Return energy is then measured at surface receiver locations at varying distances and azimuths from the source location. The travel time of energy from source to receiver, via reflections and refractions from interfaces of subsurface strata, indicates the depth and orientation of the strata.

Microseismic measurements can be characterized as a variant of seismics. In conventional seismic explorations a seismic source placed at a predetermined location, such as one or more airguns, vibrators or explosives, is activated and generates sufficient acoustic energy to cause acoustic waves to travel through the Earth. Reflected or refracted parts of this energy are then recorded by seismic receivers such as hydrophones and geophones.

In passive seismic or microseismic monitoring there is no actively controlled and triggered seismic source at a known location. The seismic energy is generated through so-called microseismic events caused by subterranean shifts and changes that at least partially give rise to acoustic waves which in turn can be recorded using suitable receivers. Although the microseismic events may be a consequence of human activity disturbing the subterranean rock, they are quite different from operation of equipment provided as an active seismic source. Background information on instruments and methods for microseismic monitoring can be found for example in U.S. Pat. Nos. 6,856,575, 6,947,843 and 6,981,550, published International Application Nos. WO 2004/0702424 and WO 2005/006020, and published United States Application No. 2005/01900649 A1, each of which are incorporated by reference herein for all purposes.

A specific field within the area of passive seismic monitoring is the monitoring of induced fracturing, where the fracturing may be induced by pumping a fluid, such as water or the like, at pressure into a borehole/wellbore (for purposes of this application the terms borehole, wellbore and well may be used interchangeably). Often induced fracturing is referred to as hydraulic fracturing as water is often the majority fluid used in the fracturing process. Such a hydraulic fracturing operation includes pumping large amounts of fluid to induce cracks in the earth, thereby creating pathways via which the oil and/or gas may flow. These cracks either will be new fractures created in previously continuous rock or will be along pre-existing faults and fractures. In general, the pathways induced by hydraulic fracturing operations will be a combination of newly created cracks and pre-existing faults and fractures. As and after a crack is generated, sand or some other proppant material is commonly injected into the crack to prevent it from closing completely when the fluid is no longer being pumped through the wellbore into the earth formation. The proppant particles that re placed within the newly formed fracture keep it open as a conductive pathway for the oil and/or gas to flow into the wellbore. In the hydrocarbon industry, hydraulic fracturing of a hydrocarbon reservoir may be referred to as "stimulation" as the intent is to stimulate the production of the hydrocarbons.

In the field of microseismic monitoring the acoustic signals generated in the course of a fracturing operation, which are caused by the generation of new cracks or displacement along existing cracks, are treated as microseismic events. Such microseismic events may occur as and after material is/has been pumped into the earth. Use may also be made of other information available from the fracturing operation, such as timing, flow rate and pressure. A well-known example of a set of microseismic data is the Carthage Cotton Valley data, evaluated for example by James T. Rutledge and W. Scott Phillips in: "HYDRAULIC STIMULATION OF NATURAL FRACTURES AS REVEALED BY INDUCED MICROEARTHQUAKES, CARTHAGE COTTON VALLEY GAS FIELD, EAST TEXAS", Geophysics Vol. 68, No 2 (March-April 2003), pp. 441-452, and Rutledge, J. T., Phillips, W. S. and Mayerhofer, M. J., "FAULTING INDUCED BY FORCED FLUID INJECTION AND FLUID FLOW FORCED BY FAULTING: AN INTERPRETATION OF THE HYDRAULIC FRACTURE MICROSEISMICITY, CARTHAGE COTTON VALLEY GAS FIELD, TEXAS", Bulletin of the Seismological Society of America, Vol. 94, No. 5, pp. 1817-1830, October 2004.

Microseismic monitoring of hydraulic fracturing is a relatively recent technology. In general, such monitoring is performed using a set of geophones located in a well in the proximity of the hydraulic fracturing. In microseismic monitoring, a hydraulic fracture is created down a borehole and data received from geophones, hydrophones and/or other sensors is processed to monitor the hydraulic fracturing. Typically the sensors are used to record microseismic wavefields generated by the hydraulic fracturing. By inverting the obtained microseismic wavefields, locations of microseismic events may be determined as well as uncertainties for the determined locations, source mechanisms and/or the like.

The spatial and temporal location of an induced microseismic event can be used to image the dynamics of a fracture growth and to quantify the stress regime in the reservoir together with formation and fault properties. This enables the effectiveness and efficiency of fracturing operations to be optimized by providing reliable information on the in-situ and induced reservoir parameters, together with the distribution of solid material within the induced pathways. Experimental work on core samples of rock (see for example Fredd, C. N., McConnell, S. B., Boney, C. L. and England, K. W. (2000): "EXPERIMENTAL STUDY OF FRACTURE CONDUCTIVITY FOR WATER-FRACTURING AND CONVENTIONAL FRACTURING APPLICATIONS", Paper SPE 74138 presented at the 2000 SPE Rocky Mountain Regional/Low Permeability Reservoirs Symposium and Exhibition, Denver, Colo., 12-15 March) has shown that the conductivity of fractures is correlated to their width which in turn is strongly dependant on the type and amount of proppant within the fractures.

Recently the use of surface and/or shallow borehole seismic arrays has become more popular because of their economical efficiency. In surface and/or shallow borehole seismic surveys, unlike traditional downhole monitoring, it is possible to install tens, hundreds or even thousands of seismic sensors at the surface or at shallow depths. These generally provide superior azimuthal coverage of the energy radiated by microseismic events as compared to the coverage provided by one or two seismic arrays that are typically used in traditional downhole monitoring. However, at the same time, surface and/or shallow arrays tend to suffer from increased signal attenuation as a result of longer source and receiver distances, together with increased noise levels. Hence, improving the signal to noise ratio is a significant issue for improved event detection and characterization.

SUMMARY

A first aspect of the present invention provides a method of monitoring a hydraulic fracturing operation in an Earth formation. The method includes: (i) selecting hydraulic fracturing conditions intended to induce tensile crack opening or compressional crack closure of a fracture responsible for a microseismic event in the Earth formation, (ii) performing a hydraulic fracturing operation using the selected conditions to cause tensile crack opening or compressional crack closure of a fracture responsible for a microseismic event in the Earth formation, (iii) receiving induced motion data from the microseismic event using a plurality of receivers, and (iv) analysing the data to track the development of the fracture responsible for the microseismic event and/or to track a proppant distribution within the fracture.

Advantageously, by performing the hydraulic fracturing operation in such a way that causes tensile crack opening or compressional crack closure of the fracture responsible for the microseismic event, it is possible to increase the signal to noise ratio of the received induced motion data as compared to a case in which only shear deformation of the crack occurs, and thereby improve the tracking of the fracture development and/or proppant distribution. The method can be used, more generally, for reservoir monitoring.

Further optional features of the first aspect of the invention will now be set out. These are applicable singly or in any combination with the first aspect of the invention.

Generally, the hydraulic fracturing conditions are selected and the hydraulic fracturing operation performed such that there is also crack shear deformation of the fracture. However, the hydraulic fracturing conditions of step (i) may be selected such that the tensile crack opening or compressional crack closure of the fracture caused in step (ii) is responsible for at least 20%, and preferably at least 30% or 40%, of the moment magnitude of the microseismic event. By increasing the amount of tensile crack opening or compressional crack closure to such a level, the signal to noise ratio of the received induced motion data can in turn be increased.

Step (i) of selecting the hydraulic fracturing conditions can include modelling microseismic events in the Earth formation in order to determine conditions predicted to induce the tensile crack opening or compressional crack closure. For example, a subsurface model, which includes stratigraphic information, such as formation boundaries and the location of faults and fractures, in addition to respective flow and mechanical properties of the formations and faults, can be constructed using standard techniques (see e.g. U.S. Pat. No. 6,766,254). The mechanical properties may include in-situ stresses, pore pressure, and elastic and failure properties of the rock and faults/fractures. The flow properties may include porosities, permeabilities, saturations, fluid types, and fluid properties (pressure-volume-temperature relationships) of the rock and faults/fractures. This model can be used as an input for a fracture model, which predicts the type and amount of failure given particular hydraulic fracturing conditions. Appropriate hydraulic fracturing conditions (such as pump rate, and volume and type of slurries) can thus be selected iteratively using the fracture model. In laboratory experiments Fredd et al. (ibid.) demonstrated the influence of the type and amount of proppant on fracture width (i.e. opening) and conductivity.

The receivers may be surface receivers or "shallow" receivers located in boreholes at depths of up to about 300 meters. Generally, surface or shallow receivers are relatively low cost to deploy, and hence can be used in high numbers. Because of the distance from the fracture, the receivers can be susceptible to seismic signal attenuation, but by increasing the amount of tensile crack opening or compressional crack closure of the fracture, the signal to noise ratio of the induced motion data received by such receivers can be rendered acceptable.

The method may further include steps before step (i) of: (a) selecting a well direction in the Earth formation which is intended to increase or maximise the amount of tensile crack opening or compressional crack closure in microseismic events caused by fracturing fluids introduced into the Earth formation from the well, and (b) drilling a well in the Earth formation having the selected direction. In step (i), the selected hydraulic fracturing conditions can then be intended to induce tensile crack opening or compressional crack closure of a fracture responsible for a microseismic event in the Earth formation caused by fracturing fluids introduced into the Earth formation from the well, and in step (ii), the performance of the hydraulic fracturing operation using the selected conditions can include introducing a fracturing fluid into the Earth formation from the well. For example, the well direction can be selected such that it is perpendicular to a direction of maximum principal stress in the Earth formation.

In step (i) the selected hydraulic fracturing conditions may include injecting a gellable fluid into the Earth formation. The gellable fluid, being highly viscous, can be particularly effective at widening the fracture responsible for a microseismic event, and thereby increasing the amount of tensile crack opening.

In step (i) the selected hydraulic fracturing conditions may include introducing proppants into the Earth formation to induce tensile crack opening of the fracture responsible for the microseismic event. Proppants, particularly at higher concentrations, can cause bridging fractures whereby the proppant forms a dam, allowing fluid pressure behind such a dam to increase, and thereby increasing the amount of tensile crack opening.

In step (i) the selected hydraulic fracturing conditions may include increasing the pumping pressure of a fracturing fluid. Increasing the pressure can increase the amount of tensile crack opening in fractures.

In step (i) the selected hydraulic fracturing conditions may include characteristics such as the rheology (e.g. a suitable fluid yield stress) and/or amount and composition of solids content (e.g. proppant material and size distribution) of a fracturing fluid. Appropriate adjustment of such characteristics can promote damming and undamming of cracks. More generally, the selected hydraulic fracturing conditions of step (i) may include a combination of fracturing fluid flow rate, fracturing fluid pressure and fracturing fluid characteristics (e.g. rheology and/or solids content) which induce tensile crack opening or compressional crack closure.

It may be desirable during hydraulic fracturing to cause repeated damming and undamming, and not necessarily at the same location. Thus steps (ii) to (iv) can be repeatedly performed, e.g. in order to cause repeated microseismic events. The analysis step can include comparing the received induced motion data from such repeats in order to identify changes in the microseismic events. As a consequence, changes to the selected hydraulic fracturing conditions for future repeats may also be identified, e.g. in order to enhance or reduce the extent of fracturing. In addition, microseismic events associated with damming-dedamming are generally associated with positioning and repositioning of injected solids. Thus repeated performance of steps (ii) to (iv) can facilitate the tracking of a proppant distribution within the fracture.

In step (iv) the analysis may be performed using a model which relates the measured induced motion to the microseismic event, the microseismic event being represented in the model by a moment tensor, which has only two types of component the component types being double couple components and tensile or compressional crack components, which can be denoted using the terminology DC and TC components, respectively. In an embodiment of the present invention, the use of such a model can simplify the analysis, for example relative to models that decompose the moment tensor into double couple, compensated linear vector dipole and isotropic parts. However, in an embodiment of the present invention, the use of only double couple and tensile or compressional crack components is physically consistent with the occurrence of tensile or compressional crack opening or compressional crack closure, together with shear deformation, in the fracture responsible for the microseismic event. In an embodiment of the present invention, the model may compare waveforms of the measured induced motion with modelled waveforms for the microseismic event, the modelled waveforms being derived from the moment tensor. In an embodiment of the present invention, the moment tensor and hence the modelled waveforms may then be iteratively adjusted to obtain a best or improved fit with the measured waveforms.

Indeed, one embodiment of the present invention provides a computer-based method of characterizing fracture networks in an Earth formation, comprising analysing induced motion data from a microseismic event using a model that relates measured induced motion to the microseismic event in order to track the development of a fracture responsible for the event and/or to track a proppant distribution within the fracture. In the embodiment, the microseismic is represented in the model by a moment tensor that has only two types of component, the component types being double couple components and tensile or compressional crack components. In some aspects, the model may compare waveforms of the measured induced motion with modelled waveforms for the microseismic event, the modelled waveforms being derived from the moment tensor. The moment tensor and hence the modelled waveforms may then be iteratively adjusted to obtain a best or improved fit with the measured waveforms.

The method may include a step before the analysing step of receiving the induced motion data from the microseismic event using a plurality of receivers.

The method may include a step before the receiving step of performing a hydraulic fracturing operation to cause the microseismic event in the Earth formation.

Other embodiments of the present invention provide a system (e.g. a computer system, a software system, one or more processors and/or the like) for characterizing fracture networks in an Earth formation. In such embodiments, the system may include: a processor(s) configured to analyse induced motion data from a microseismic event using a model that relates measured induced motion to the fracturing event and thereby tracks the development of a fracture responsible for the event and/or tracks a proppant distribution within the fracture. The microseismic event being represented in the model by a moment tensor that has only two types of component, the component types being double couple components and tensile or compressional crack components.

The model may compare waveforms of the measured induced motion with modelled waveforms for the microseismic event, the modelled waveforms being derived from the moment tensor. The moment tensor and hence the modelled waveforms may then be iteratively adjusted by the model to obtain a best or improved fit with the measured waveforms.

The system may further include a computer-readable medium which stores the induced motion data from the microseismic event.

The system may further include: a plurality of receivers for receiving the induced motion data from the microseismic event.

Further aspects of the present invention provide a computer program comprising code which, when run on a computer, causes the computer to perform the method of the second aspect; and a computer readable medium storing a computer program comprising code which, when run on a computer, causes the computer to perform the method of the second aspect.

Further optional features of the invention will now be set out. These like other features described herein are applicable singly or in any combination with different embodiments of the invention, or uses of embodiments of the present invention.

The fracture responsible for the microseismic event may be in a hydrocarbon-bearing layer of a hydrocarbon reservoir, such as a gas-bearing shale layer of a shale gas reservoir. However, another option is for the fracture to be in a water-bearing layer of an aquifer, or in a layer of a geothermal formation.

BRIEF DESCRIPTION OF THE DRAWINGS

The present disclosure is described in conjunction with the appended figures.

Figure 1:
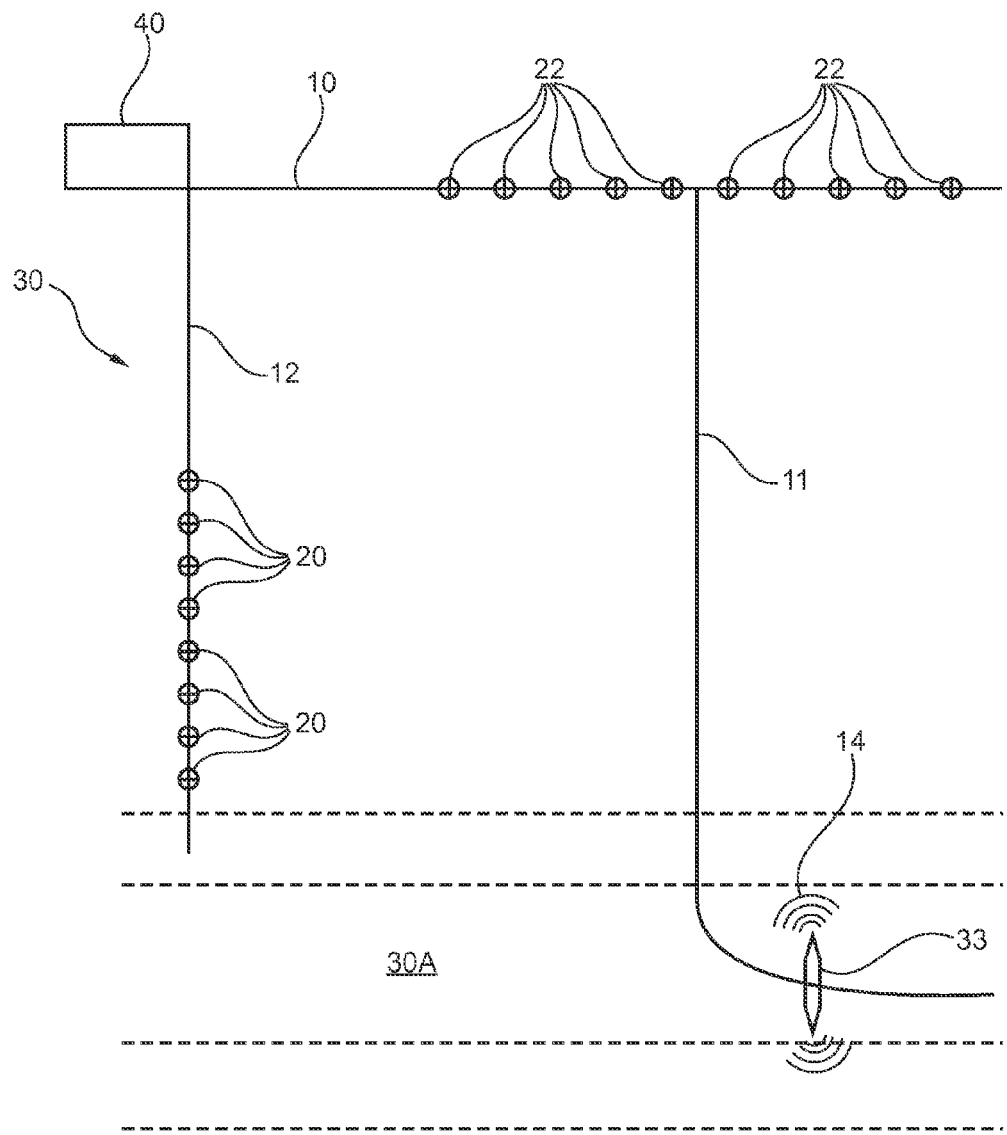
FIG. 1 is a schematic illustration of a system for obtaining microseismic data related to hydraulic fracturing, in accordance with an embodiment of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Specific details are given in the following description to provide a thorough understanding of the embodiments. However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

Also, it is noted that embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

As disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Embodiments of the present invention provide for characterizing natural fracture networks or other textural networks in an Earth formation. In an embodiment of the present invention, data obtained from a microseismic event may be processed to provide for the characterization of the natural fracture networks or other textural networks in the Earth formation.

FIG. 1 is a schematic illustration of a system for obtaining microseismic data related to hydraulic fracturing, in accordance with an embodiment of the present invention. A fracturing borehole 11 extends from a surface 10 through an Earth formation 30. A geophone receiver array 22 may be disposed at the surface 10, and/or in boreholes at shallow depths of up to about 300 m. Other geophone receiver arrays 20 may be disposed in one or more deeper monitoring boreholes 12 extending from the surface 10 through the Earth formation 30, and typically spaced hundreds of meters from the fracturing borehole 11. The geophone arrays 20, 22 may each comprise a plurality of geophone receivers. geophones in the geophone arrays 20, 22 may be spaced of the order of tens of meters apart.

During hydraulic fracturing, a fluid (not shown), which may include solid particles (e.g. a proppant), is pumped from the surface 10 into the fracturing borehole 11 so as to cause the Earth formation 30 surrounding the fracturing borehole 11 to undergo a microseismic event, resulting in the generation of a fracture 33 in the Earth formation 30. In the hydrocarbon industry, the fluid may be pumped down the fracturing borehole 11 to provide for the fracturing of a hydrocarbon bearing layer 30A in the Earth formation 30. In such an arrangement where the portion of the Earth formation 30 being fractured is the hydrocarbon-bearing layer 30A, the fracture 33 is produced at least partially within the hydrocarbon-bearing layer 30A. By generating the fracture 33 at least partially within the hydrocarbon-bearing layer 30A, production channels may be set up in the hydrocarbon-bearing layer 30A allowing for flow of the hydrocarbons in the hydrocarbon-bearing layer 30A to the fracturing borehole 11.

One possibility is that the hydrocarbon-bearing layer is a shale. A reservoir which is a shale is generally of low permeability and is stimulated by fracturing in order to achieve production, but incorporates natural fractures which become connected to the newly-formed fracture.

During the fracturing process, acoustic waves 14 are generated by the fracture 33 and the acoustic waves 14 may propagate through the Earth formation 30 and be detected by the geophone receiver arrays 20, 22. As such, the geophone arrays 20, 22 may be used to collect induced motion data related to the hydraulic fracturing procedure taking place in the fracturing borehole 11. The geophone receivers in the geophone arrays may comprise three-component geophones and may provide directional (three-dimensional) data for the received acoustic waves 14. Alternatively or additionally, the geophone receivers in the geophone arrays may comprise one component geophones, usually arranged to measure the vertical component of the wavefield. The data received by the geophone arrays 20, 22 may be recorded and then processed and/or transmitted to a processor 40 for processing.

Generally, the surface/shallow geophone receiver array 22 is less costly to set up than the deep array 20. However, the source mechanism of the microseismic event is one of the primary factors causing variations in the amplitude of the seismic wave at or near the surface 10. The variation of the radiation pattern results largely from the difference in the fault plane parameters and amount of non-double couple component, the latter being particularly significant for hydraulic fracture induced microseismic events. An insight behind the present invention is that the amplitude of the compressional seismic wave becomes more significant as the tensile or compressive component of the fracture deformation (i.e. crack opening or closure) increases. Thus, if hydraulic fracturing conditions are selected which favour tensile crack opening or compressional crack closure, the effectiveness of fracturing operation monitoring using a microseismic approach can be improved.

Figure 2:
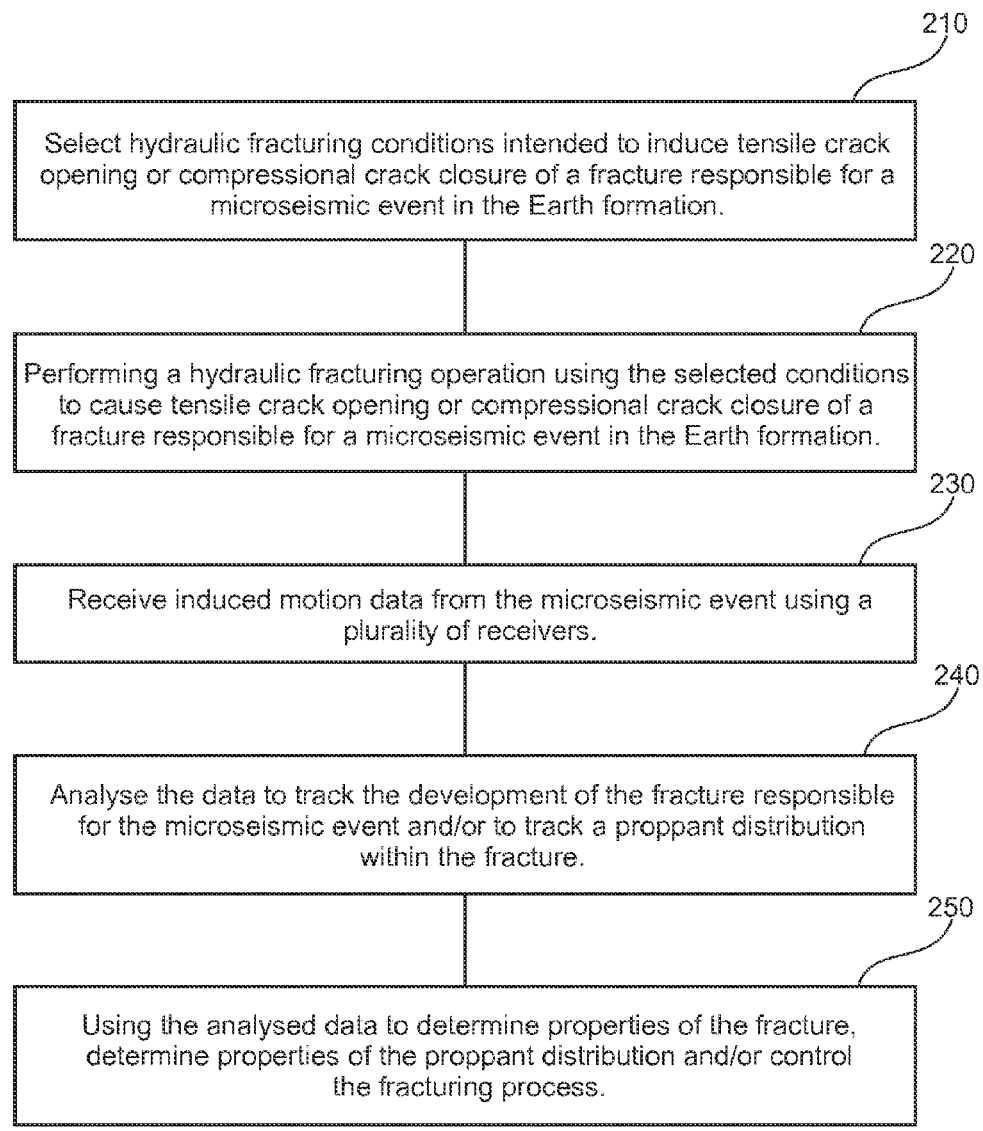
FIG. 2 is a flow chart describing a method of monitoring a hydraulic fracturing operation in an Earth formation, in accordance with an embodiment of the present invention.

FIG. 2 is a flow chart describing a method of monitoring a hydraulic fracturing operation in an Earth formation, in accordance with an embodiment of the present invention. In the method, in step 210, hydraulic fracturing conditions that will induce tensile crack opening or compressional crack closure of a fracture responsible for a microseismic event in the Earth formation are determined. In step 220, a hydraulic fracturing operation using the selected conditions to cause tensile crack opening or compressional crack closure of a fracture responsible for a microseismic event in the Earth formation is performed. In step 230, induced motion data from the microseismic event is received using a plurality of receivers. In step 240, the data to track the development of the fracture responsible for the microseismic event and/or to track a proppant distribution within the fracture is analyzed. In step 250, the analyzed data may be used to determine properties of the fracture, determine properties of the proppant distribution and/or control/manage the fracturing process. For example, properties of the fracture may be used in a reservoir model, to analyze hydrocarbon production from the formation, to analyze potential seismic effects resulting from the fracturing, to analyze propped open flow paths for hydrocarbon flow, to analyze properties of flow paths in the formation, control/manage the ongoing fracturing process (such as an amount/pressure of fracturing fluids, proppant properties or viscoelastic materials to be used in subsequent fracturing processes) and/or the like.

In some embodiment of the present invention, the method may be performed to manage/monitor the fracturing process as it is performed. In such embodiments, a processor or the like may be used to process hydraulic fracturing conditions that will induce tensile crack opening or compressional crack closure of a fracture responsible for a microseismic event in the Earth formation. These conditions may then be transmitted/displayed to a party in control of the fracturing process. This party may then perform a fracturing process using the processed conditions. The management/monitoring system, may then receive an output from a plurality of receivers that are being used to monitor the fracturing process. The processor or one more other processors may be used to process the development of the fracture responsible for the microseismic event and/or track a proppant distribution within the fracture. The processed development of the fracture responsible for the microseismic event and/or the tracked proppant distribution within the fracture may be displayed/communicated to the party performing the fracturing process.

Decomposing the source mechanism into the double couple and tensile or compressional crack components can make the significance of the tensile or compressive component apparent. Further, using a model in which the microseismic event is represented by a moment tensor which has only double couple (DC) and tensile or compressional crack (TC) components can also simplify the analysis of the induced motion data, e.g. relative to conventional models which decompose the moment tensor into DC, compensated linear vector dipole (CLVD) and isotropic (ISO) parts, and which can be difficult to interpret and require non-physical and highly complicated source processes (see e.g. H. Dufumier and L. Rivera, in: "ON THE RESOLUTION OF THE ISOTROPIC COMPONENT IN MOMENT TENSOR INVERSION", *Geophysical Journal International* Vol. 131, No 3 (December 1997), pp. 595-606)

We now describe the DC and TC source model, in accordance with an embodiment of the present invention, starting with some background on moment tensor approaches.

The induced motion, u, observed at a point x and time t can be expressed as follows (Aki, K. and Richards, P. G. QUANTITATIVE SEISMOLOGY, *University Science Books*, $2^{nd}$ Edition, Sausalito, Calif., 2002).

$$u_i(x,t) = m_{kl} * G_{ik,l}, \quad (1)$$

where $m_{kl} = M_{kl}f(t)$ $m_{kl} = M_{kl}$ f is the moment tensor function, $M_{kl}$ is the second rank seismic moment tensor which consists of six independent elements, f(t) is the source-time function and $G_{ik,l}$ denotes the spatial derivative of the Green's function. A point source can be represented by the combination of three fundamental faults: a vertical strike-slip fault; a vertical dip slip fault and a dip-slip fault with a dip of 45 degree and isotropic source (Langston, C. A., (1981), SOURCE INVERSION OF SEISMIC WAVEFORMS: THE KOYNA, INDIA, EARTHQUAKES OF 13 Sep. 1967, *Bulletin of the Seismological Society of America*, 71, 1-24; Minson, S. and D. Dreger (2008), STABLE INVERSIONS FOR COMPLETE MOMENT TENSORS, *Geophysical Journal International*, 174, 585-592). The three components of induced motion shown in equation (1) will be:

$$u_Z = A_1 \cdot ZSS + A_2 \cdot ZDS + A_3 \cdot ZDD + M_{iso} \cdot ZEP,$$

$$u_R = A_1 \cdot RSS + A_2 \cdot RDS + A_3 \cdot RDD + M_{iso} \cdot REP,$$

$$u_T = A_4 \cdot TSS + A_5 \cdot TDS, \quad (2)$$

where Z, R and T refer to the vertical, radial and transverse component and SS, DS, DD and EP denote the vertical strike slip, vertical dip-slip and 45° dip-slip and explosion Green's functions, respectively, and $$M_{iso} = \frac{tr(M)}{3}, \quad (3)$$

The coefficients $A_i$ are represented by the moment tensor components and the source-receiver azimuth measured clockwise from the North:

$$A_1 = \frac{1}{2}(M_{xx} - M_{yy})\cos(2az) + M_{xy}\sin(2az), \quad (4)$$

$$A_2 = M_{xz}\cos(az) + M_{yz}\sin(az),$$

$$A_3 = \frac{1}{6}(M_{xx} + M_{yy} \; 2M_{zz}),$$

$$A_4 = \frac{1}{2}(M_{xx} - M_{yy})\sin(2az) + M_{xy}\cos(2az),$$

$$A_5 = -M_{yz}\cos(az) + M_{xz}\sin(az).$$

As mentioned above, conventionally, the moment tensor is decomposed into a deviatoric part and an ISO part, with the deviatoric part being further decomposed into DC and CLVD parts.

Figure 3:
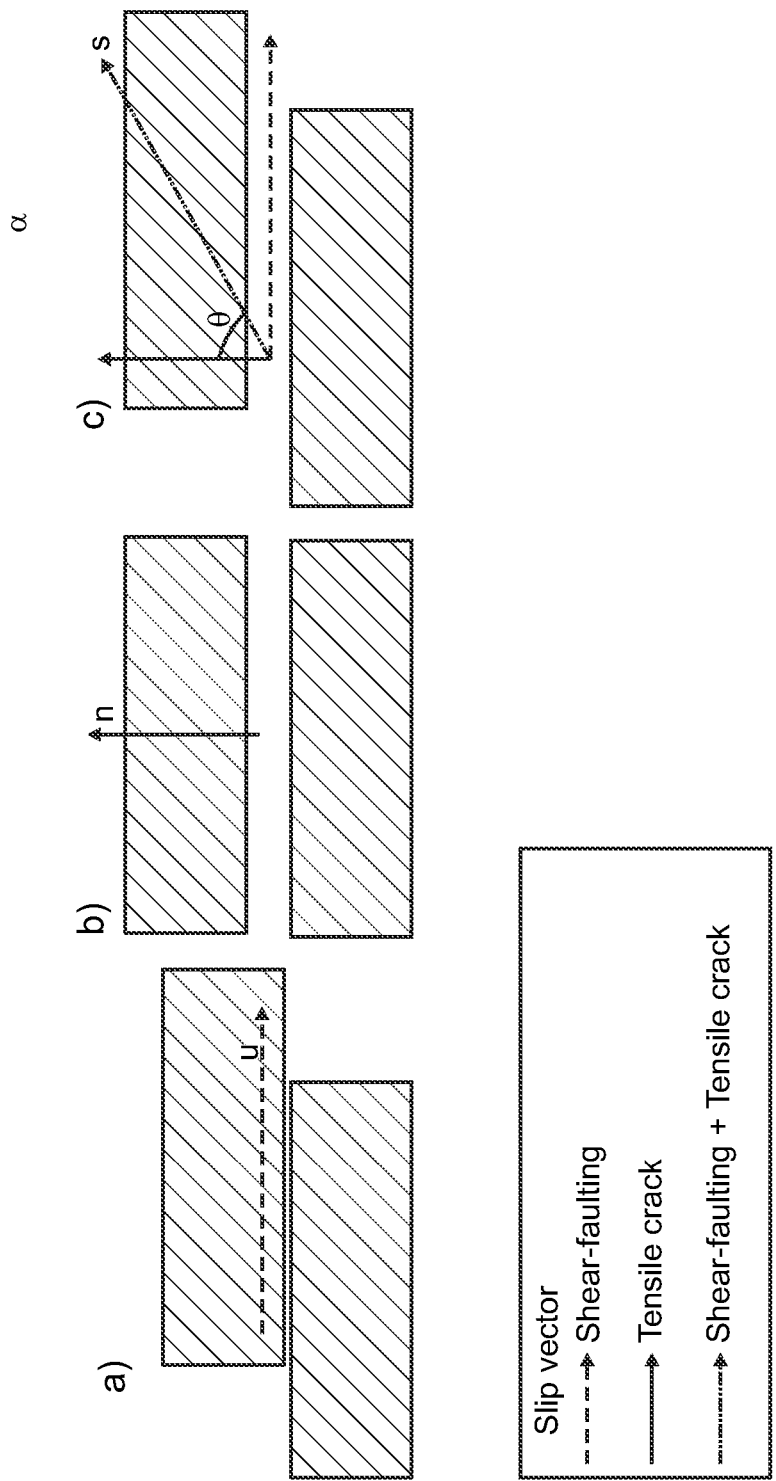
FIG. 3 shows schematically microseismic focal mechanisms for (a) slip on a fracture surface, (b) tensile crack opening, and (c) a combination of (a) and (b), in accordance with an embodiment of the present invention.

We now, however, describe the DC and TC source model, in accordance with an embodiment of the present invention. Instead of decomposing the general moment tensor into ISO, DC and CLVD components, the source mechanism is assumed to be a combination of just the double couple and tensile or compressional crack model, as shown schematically in FIG. 3. This assumption is reasonable for a hydraulic-fracturing induced microearthquake (i.e. a microseismic event) and provides physically meaningful parameters. In particular, the original ISO, DC, CLVD decomposition derives from earthquake mechanics in which deformation originates from magma movement. In hydraulic fracturing, by contrast, the induced fractures can generally only be sheared or opened/closed, and thus the DC and TC source model is physically reasonable.

The moment tensor components in equation (1) in an isotropic medium for a DC are given by:

$$M_{kl} = \mu A \bar{u}(u_l n_l + n_k u_l),$$

or in matrix form:

$$M = \mu A \bar{u}(un^T + nu^T) \quad (5)$$

where superscript T represents the vector transpose, $\mu$ is the shear modulus, $\bar{u}$ is the average slip on the fault plane, A is the area of fault plane, u is the slip vector on the fault surface and n is the vector normal to the fault plane (e.g. Aki and Richards, 2002). The eigenvalues of the DC component are proportional to (1, 0, −1) and the orthogonal eigenvectors of these values are represented by:

$$t = \frac{1}{\sqrt{2}}(n+u), \quad (6)$$

$$b = n + u, \quad (7)$$

$$p = \frac{1}{\sqrt{2}}(n-u). \quad (8)$$

The eigenvectors t, b and p correspond to the tension (positive eigenvalue), null (zero eigenvalue) and pressure (negative eigenvalue) axis, respectively. Together with strike $\varphi$, dip $\delta\delta$ and slip $\sigma$ of the faulting, the slip vector and fault normal vector are given by:

$$u = \bar{u}(\cos\sigma\cos\varphi + \cos\delta\sin\sigma\sin\varphi)e_x + \\ \bar{u}(\cos\sigma\cos\varphi - \cos\delta\sin\sigma\sin\varphi)e_y + \bar{u}\sin\delta\sin\sigma e_z. \quad (9)$$

$$n = -\sin\delta\sin\varphi e_x + \sin\delta\cos\varphi e_y - \cos\delta e_z. \quad (10)$$

The strike $\varphi$ is measured clockwise from north, with the fault plane dipping to the right when looking along the strike direction. The dip $\delta\delta$ is measured from the horizontal. The slip a is the angle between the strike direction and the direction the hanging wall √ moved relative to the footwall. The scalar seismic moment is:

$$M_o = \mu A \bar{u}. \quad (11)$$

Together with equation (9), (10) and (11), the moment tensor elements in equation (5) are defined in terms of strike, slip and slip angles:

$$M_{xx}^{DC} = -M_o(\sin\delta\cos\lambda\sin 2\varphi + \sin 2\delta\sin\lambda\sin^2\varphi),$$

$$M_{yy}^{DC} = M_o(\sin\delta\cos\lambda\sin 2\varphi + \sin 2\delta\sin\lambda\sin^2\varphi),$$

$$M_{yy}^{DC} = -M_0(\sin\delta\cos\sigma\sin 2\varphi + \sin 2\delta\sin\sigma\sin^2\varphi),$$

$$M_{zz}^{DC} = M_o(\sin 2\delta\sin\lambda),$$

$$M_{xy}^{DC} = M_o(\sin\delta\cos\lambda\cos 2\varphi + 0.5\sin 2\delta\sin\lambda\sin^2\varphi),$$

$$M_{xz}^{DC} = -M_o(\cos\delta\cos\lambda\cos\varphi + \cos 2\delta\sin\lambda\sin\varphi),$$

$$M_{yz}^{DC} = -M_o(\cos\delta\cos\lambda\sin\varphi - \cos 2\delta\sin\lambda\cos\varphi). \quad (12)$$

Following Dufumier, H. and L. Rivera (1997), ON THE RESOLUTION OF THE ISOTROPIC COMPONENT IN MOMENT TENSOR INVERSION, *Geophysical Journal International*, 131, 595-606; Minson, S. D. Dreger, R. Burgmann and K. Larsen (2007), SEISMICALLY AND GEODETICALLY DETERMINED NON-DOUBLE-COUPLE SOURCE MECHANISMS FROM THE 2000 MIYAKEJIMA VOLCANIC EARTHQUAKE SWARM, *Journal of Geophysical Research*, 112, BI0308, doi:10.1029/2006JB004847; and Taira, T., R. B. Smith and W.-L. Chang (2010), SEISMIC EVIDENCE FOR DILATATIONAL SOURCE DEFORMATIONS ACCOMPANYING THE 2004-2008 YELLOWSTONE ACCELERATED UPLIFT EPISODE, *Journal of Geophysical Research*, 115, B02301, doi: 10.1029/200818006281, the moment tensor elements for the DC and TC source model are described as follows. The direction of tensile dislocation is normal to the shear fault plane. The slip vector s is then defined by:

$$s = \cos\alpha n + \sin\alpha u, \quad (13)$$

where n is positive outwards and $\alpha$ is the angle between n and s. The cases $\alpha = 0°$ and $\alpha = 180°$ correspond to pure opening and closing tensile crack and $\alpha = 90°$ corresponds to pure shear deformation. The general expression of moment tensor shown in the equation (5) is given by (Aki and Richards, 2002):

$$M = Au(\lambda(s \cdot n)I + \mu(ns^T + sn^T)), \quad (14)$$

where I is the identity matrix and $\lambda$ and $\rho$ are the Lamé (elastic) constants, respectively. For the DC and TC source, M is decomposed into shear faulting part $M^{DC}$, and tensile or compressional crack part $M^{TC}$:

$$M = M^{DC} + M^{TC}. \quad (15)$$

For a Poisson solid (i.e., $\lambda = \mu$), $M^{TC}$ is obtained from the equation (12) assuming $\alpha = 0°$:

$$M_{xx}^{TC} = M^{TC}(1 + 2\sin^2\delta\sin^2\varphi),$$

$$M_{yy}^{TC} = M^{TC}(1 + 2\sin^2\delta\sin^2\varphi),$$

$$M_{zz}^{TC} = -M^{TC}(1 + \cos^2\delta),$$

$$M_{xy}^{TC} = M^{TC}(-\sin^2\delta\sin 2\varphi)$$

$$M_{xz}^{TC} = M^{TC}(\sin 2\delta\sin\varphi),$$

$$M_{yz}^{TC} = -M^{TC}(\sin 2\delta\cos\varphi). \quad (16)$$

The DC and TC model allows the variation of the signal amplitude due to changes in tensile or compressional crack opening component, in addition to changes of other fault solution parameters, to be quantified.

To construct synthetic waveforms, firstly the Green's functions for the fundamental fault and explosion source are computed. Substituting equation (4) to (2) yields the three components of the observed induced motion (Minson, S. and D. Dreger (2008), STABLE INVERSIONS FOR COMPLETE MOMENT TENSORS, *Geophysical Journal International*, 174, 585-592):

$$u_z = M_{xx}\left[\frac{ZSS}{2}\cos(2az) - \frac{ZDD}{6} + \frac{ZEP}{3}\right] + \\ M_{yy}\left[\frac{ZSS}{2}\cos(2az) - \frac{ZDD}{6} + \frac{ZEP}{3}\right] + M_{zz}\left[\frac{ZDD}{3} + \frac{ZEP}{3}\right] + \\ M_{xy}[ZSS\sin(2az)] + M_{xz}[ZDS\cos(az)] + M_{yz}[ZDS\sin(az)], \quad (17)$$

-continued $$u_r = M_{xx}\left[\frac{RSS}{2}\cos(2az)\ \frac{RDD}{6}+\frac{REP}{3}\right]+ \tag{18}$$
$$M_{yy}\left[\frac{RSS}{2}\cos(2az)\ \frac{RDD}{6}+\frac{REP}{3}\right]+M_{zz}\left[\frac{RDD}{3}+\frac{REP}{3}\right]+$$
$$M_{xy}[RSS\sin(2az)]+M_{xz}[RDS\cos(az)]+M_{yz}[RDS\sin(az)],$$

$$u_t = M_{xx}\left[\frac{TSS}{2}\sin(2az)\right]+M_{yy}\left[\frac{TSS}{2}\sin(2az)\right]+ \tag{19}$$
$$M_{xy}[TSS\cos(2az)]+M_{xz}[TDS\sin(az)]+M_{yz}[TDS\cos(az)].$$

Figure 4:
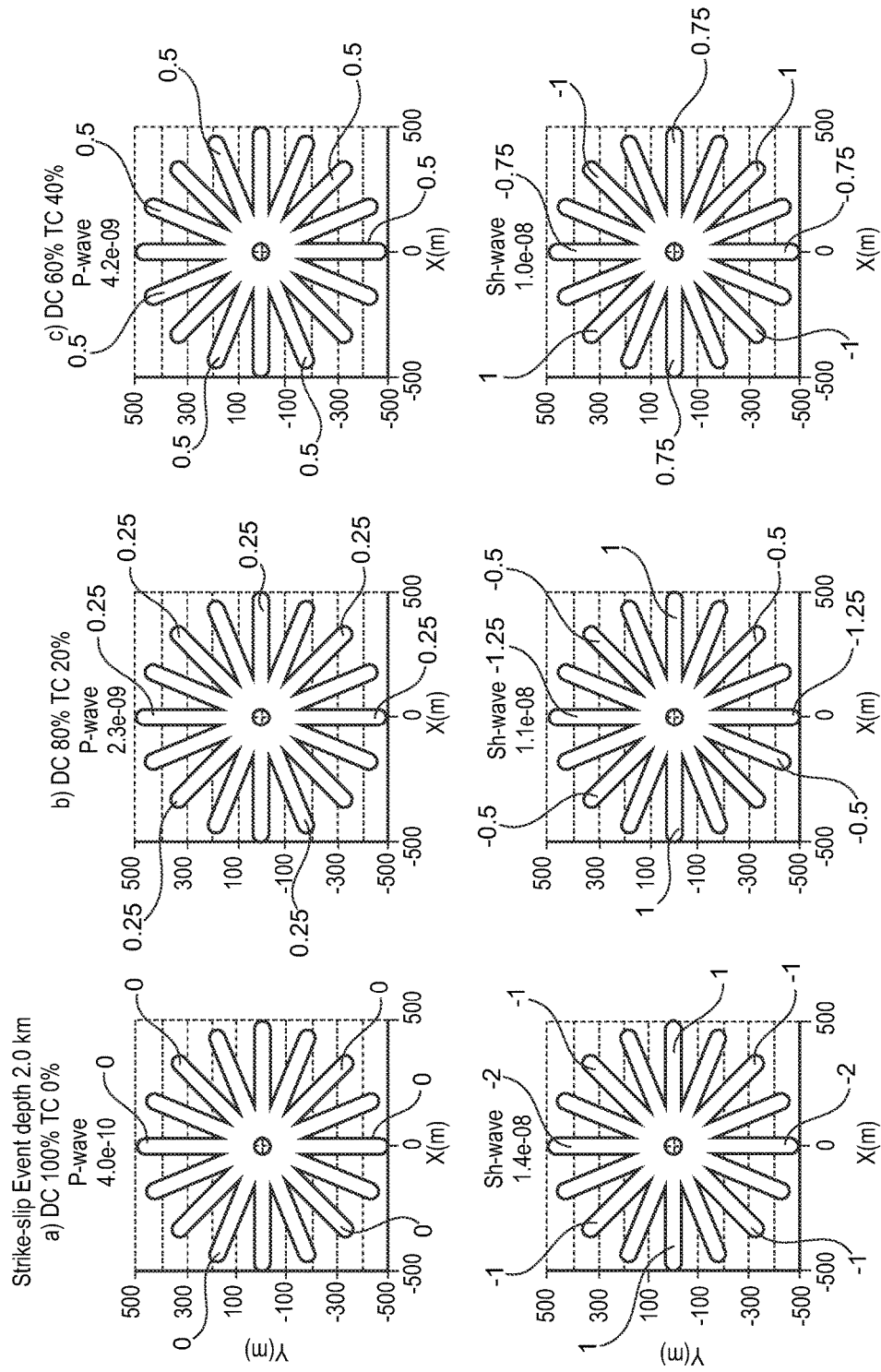
FIG. 4 shows modelled shear and compressional signals at the earth's surface for horizontal source-receiver distances up to 500 m, the events being strike slip with event depth 2.0 km, and in cases (a), (b) and (c) the TC component being 0%, 20% and 40% respectively, in accordance with an embodiment of the present invention.
Figure 5:
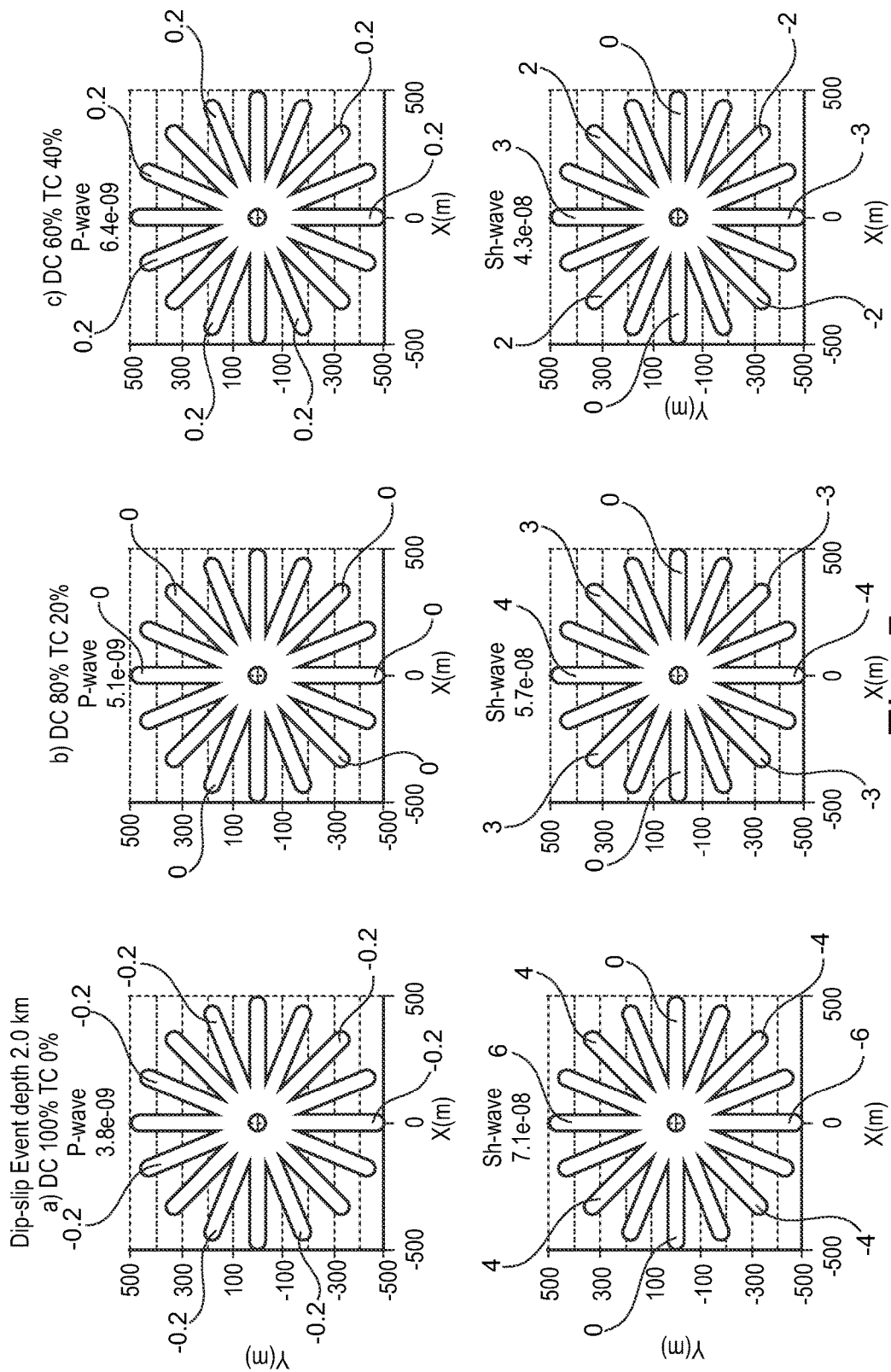
FIG. 5 shows modelled shear and compressional signals at the earth's surface for horizontal source-receiver distances up to 500 m, the events being dip slip with event depth 2.0 km, and in cases (a), (b) and (c) the TC component being 0%, 20% and 40% respectively, in accordance with an embodiment of the present invention.

The following examples of FIGS. 4 and 5 show how, in accordance with embodiments of the present invention, the modelled signal amplitude variation changes with the source mechanism. In the examples, the event strike angle is fixed to that of fracture orientation, and the event moment magnitude is fixed at −1.4.

FIG. 4 shows, in accordance with an embodiment of the present invention, modelled shear and compressional signals at the earth's surface for horizontal source-receiver distances up to 500 m. The events are strike slip with event depth 2.0 km. In cases (a), (b) and (c) the TC component is 0%, 20% and 40% respectively. Each P-wave or Sh-wave number indicates the maximum amplitude of the respective wave in m/s.

FIG. 5 shows, in accordance with an embodiment of the present invention, shear and compressional signals at the earth's surface for horizontal source-receiver distances up to 500 m. The events are dip slip with event depth 2.0 km. In cases (a), (b) and (c) the tensile component is 0% 20%, and 40% respectively. Each P-wave or Sh-wave number indicates the maximum amplitude of the respective wave in m/s.

In the strike-slip cases of FIG. 4, the additional tensile crack component significantly increases P-wave amplitude observed at the surface. For example, the event with a 40% tensile crack component increases the amplitude by a factor in excess of ten as compared to the event where there is no tensile opening. In contrast, only a slight increase in the P-wave amplitude is observed for the corresponding dip-slip events (FIG. 5).

Next, the maximum P, vertical shear (Sv), and horizontal shear (Sh) amplitudes were compared for different event depths, source-receiver distances, and source mechanisms in synthetic tests. Again, the moment magnitude was fixed to −1.4. The results are shown in Table 1.

TABLE 1

Maximum P, Sv, and Sh amplitudes for different event depths, source-receiver distances, and mechanisms. Event a): depth 1 km and horizontal source receiver distance up to 500 m. Event b): depth 1 km and horizontal source receiver distance up to 1000 m. Event c): depth 1 km and horizontal source receiver distance up to 2000 m. Event d): depth 2 km and horizontal source receiver distance up to 500 m. Event e): depth 2 km and horizontal source receiver distance up to 1000 m. Event f): depth 2 km and horizontal source receiver distance up to 2000 m.

|  | 0% TC str | 20% TC str | 40% TC str | 0% TC dip | 20% TC dip | 40% TC dip |
|---|---|---|---|---|---|---|
| a) 1 km/500 m | | | | | | |
| P | 1.16E−08 | 2.64E−08 | 4.18E−08 | 5.29E−08 | 6.14E−08 | 6.98E−08 |
| SV | 1.85E−07 | 1.92E−07 | 2.10E−07 | 6.54E−07 | 5.40E−07 | 4.43E−07 |
| SH | 2.05E−07 | 1.68E−07 | 1.47E−07 | 6.59E−07 | 5.27E−07 | 3.95E−07 |
| b) 1 km/1000 m | | | | | | |
| P | 1.69E−08 | 2.77E−08 | 4.19E−08 | 5.36E−08 | 6.18E−08 | 7.00E−08 |
| SV | 1.88E−07 | 1.95E−07 | 2.13E−07 | 6.54E−07 | 5.40E−07 | 4.43E−07 |
| SH | 2.13E−07 | 1.75E−07 | 1.53E−07 | 6.59E−07 | 5.27E−07 | 3.95E−07 |
| c) 1 km/2000 m | | | | | | |
| P | 1.69E−08 | 2.77E−08 | 4.19E−08 | 5.36E−08 | 6.18E−08 | 7.00E−08 |
| SV | 1.88E−07 | 1.95E−07 | 2.13E−07 | 6.54E−07 | 5.40E−07 | 4.43E−07 |
| SH | 2.13E−07 | 1.75E−07 | 1.53E−07 | 6.59E−07 | 5.27E−07 | 3.95E−07 |
| d) 2 km/500 m | | | | | | |
| P | 4.03E−10 | 2.28E−09 | 4.19E−09 | 3.84E−09 | 5.10E−09 | 6.36E−09 |
| SV | 1.34E−08 | 1.39E−08 | 1.52E−08 | 7.13E−08 | 5.81E−08 | 4.77E−08 |
| SH | 1.39E−08 | 1.14E−08 | 9.97E−09 | 7.13E−08 | 5.70E−08 | 4.28E−08 |
| e) 2 km/1000 m | | | | | | |
| P | 1.20E−09 | 2.78E−09 | 4.44E−09 | 5.64E−09 | 6.54E−09 | 7.44E−09 |
| SV | 1.97E−08 | 2.05E−08 | 2.24E−08 | 7.13E−08 | 5.81E−08 | 4.77E−08 |
| SH | 2.18E−08 | 1.78E−08 | 1.56E−08 | 7.13E−08 | 5.70E−08 | 4.28E−08 |
| f) 2 km/2000 m | | | | | | |
| P | 1.82E−09 | 2.96E−09 | 4.45E−09 | 5.75E−09 | 6.60E−09 | 7.46E−09 |
| SV | 2.02E−08 | 2.10E−08 | 2.30E−08 | 7.13E−08 | 5.81E−08 | 4.77E−08 |
| SH | 2.30E−08 | 1.88E−08 | 1.65E−08 | 7.13E−08 | 5.70E−08 | 4.28E−08 |

The results indicate that the increase of P amplitude is more significant for the deeper strike slip mechanism with short source-receiver distance, as expected from the 3D P-wave radiation pattern. The Sv amplitude slightly increases with the increase of the TC component for the strike slip case, but the Sh amplitude slightly decreases.

For the dip-slip case, the P wave amplitude also increases as the TC component increases, but both the Sv and the Sh wave decrease by a similar percentage. However, the S wave amplitude is still much larger than that of P wave.

For model based localization of microseismic events, observing both the P- and S-wave is important. Although adding a TC component to the microseismic event mechanism can sacrifice the S-wave amplitude, this may be more than compensated by a boost to the P-wave amplitude.

As the synthetic tests show, the 100% pure shear strike slip is the worst case scenario in terms of event detection at the surface. However, synthetic simulations can help to determine optimal hydraulic fracturing conditions to cause tensile crack opening or compressional crack closure, and thereby to increase the likelihood of the event detection. For example, since the principal stress orientation in the formation layer where the microseismic event occurs can generally be predicted from geological survey, the well direction in the layer can be selected to increase the amount of tensile crack opening or compressional crack closure. Other options are to inject a gellable fluid and thereby widen a fracture to increase the amount of tensile crack opening, or to introduce proppants to produce fracture damming which can increase fluid pressures between the dam location and the wellbore and thereby increase the amount of tensile crack opening. As a dam ruptures, dynamic effects may lead to fluctuations of the fluid pressure within the fracture causing additional changes in the fracture width or dynamic fracturing if the dam is close to the fracture tip.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to above are hereby incorporated by reference for all purposes.

The invention claimed is:

1. A method of monitoring a hydraulic fracturing operation in an Earth formation, the method comprising:
  (i) selecting hydraulic fracturing conditions to induce tensile crack opening or compressional crack closure of a fracture responsible for a microseismic event in the Earth formation;
  (ii) performing a hydraulic fracturing operation using the selected conditions to cause tensile crack opening or compressional crack closure of the fracture responsible for the microseismic event in the Earth formation;
  (iii) receiving induced motion data from the microseismic event using a plurality of receivers; and
  (iv) analysing the data to track the development of the fracture responsible for the microseismic event or to track a proppant distribution within the fracture responsible for the microseismic event, wherein the analysis is performed using a model relating measured induced motion to the microseismic event, and wherein the microseismic event is represented in the model by a moment tensor that has exactly two types of component, wherein the two types of component are: (1) double couple components, and (2) tensile or compressional crack components.

2. The method of claim 1, further comprising:
  using the analyzed data for at least one of determining properties of the fracture and controlling the fracturing operation.

3. A method according to claim 1, wherein the hydraulic fracturing conditions of step (i) are selected such that the tensile crack opening or compressional crack closure of the fracture caused in step (ii) is responsible for at least 20% of a moment magnitude of the microseismic event.

4. A method according to claim 1, wherein:
the method further includes steps before step (i) of:
  (a) selecting a well direction in the Earth formation that is intended to increase or maximise an amount of tensile crack opening or compressional crack closure in microseismic events caused by fracturing fluids introduced into the Earth formation from the well, and
  (b) drilling a well in the Earth formation having the selected direction, and
in step (i), the selected hydraulic fracturing conditions are intended to induce tensile crack opening or compressional crack closure of a fracture responsible for a microseismic event in the Earth formation caused by fracturing fluids introduced into the Earth formation from the well, and in step (ii), the performance of the hydraulic fracturing operation using the selected conditions includes introducing a fracturing fluid into the Earth formation from the well.

5. A method according to claim 1, wherein in step (i) the selected hydraulic fracturing conditions include injecting a gellable fluid into the Earth formation.

6. A method according to claim 1, wherein in step (i) the selected hydraulic fracturing conditions include introducing proppants into the Earth formation.

7. A method of characterizing fracture networks in an Earth formation, the method comprising:
  performing a hydraulic fracturing operation to cause a microseismic event in the Earth formation;
  receiving induced motion data from the microseismic event using a plurality of receivers; and
  analysing induced motion data from the microseismic event using a model that relates measured induced motion to the microseismic event in order to track the development of a fracture responsible for the event or to track a proppant distribution within the fracture, wherein the microseismic event is represented in the model by a moment tensor that has exactly two types of component, and wherein the two types of component are: (1) double couple components, and (2) tensile or compressional crack components.

8. A method according to claim 7, wherein the fracture responsible for the microseismic event is in a hydrocarbon-bearing layer of a hydrocarbon reservoir.

9. A system for characterizing fracture networks in an Earth formation, the system including:
  a processor(s) configured to analyse induced motion data from a microseismic event using a model relating measured induced motion to the microseismic event and thereby tracking the development of a fracture responsible for the event or tracking a proppant distribution within the fracture, wherein the microseismic event is represented in the model by a moment tensor that has exactly two types of component, and wherein the two types of component are: (1) double couple components, and (2) tensile or compressional crack components.

10. A system according to claim 9, further comprising:
a non-transitory computer-readable medium which stores the induced motion data from the microseismic event.

11. A system according to claim 9, further including:
a plurality of receivers for receiving the induced motion data from the microseismic event.

* * * * *